3,289,504
AUTOMATIC LATHE
Pierre Bergonzo, 117 Route de la Capite, Cologny,
Geneva, Switzerland
Filed Mar. 12, 1964, Ser. No. 351,333
Claims priority, application Switzerland, Mar. 15, 1963,
3,348/63
3 Claims. (Cl. 82—28)

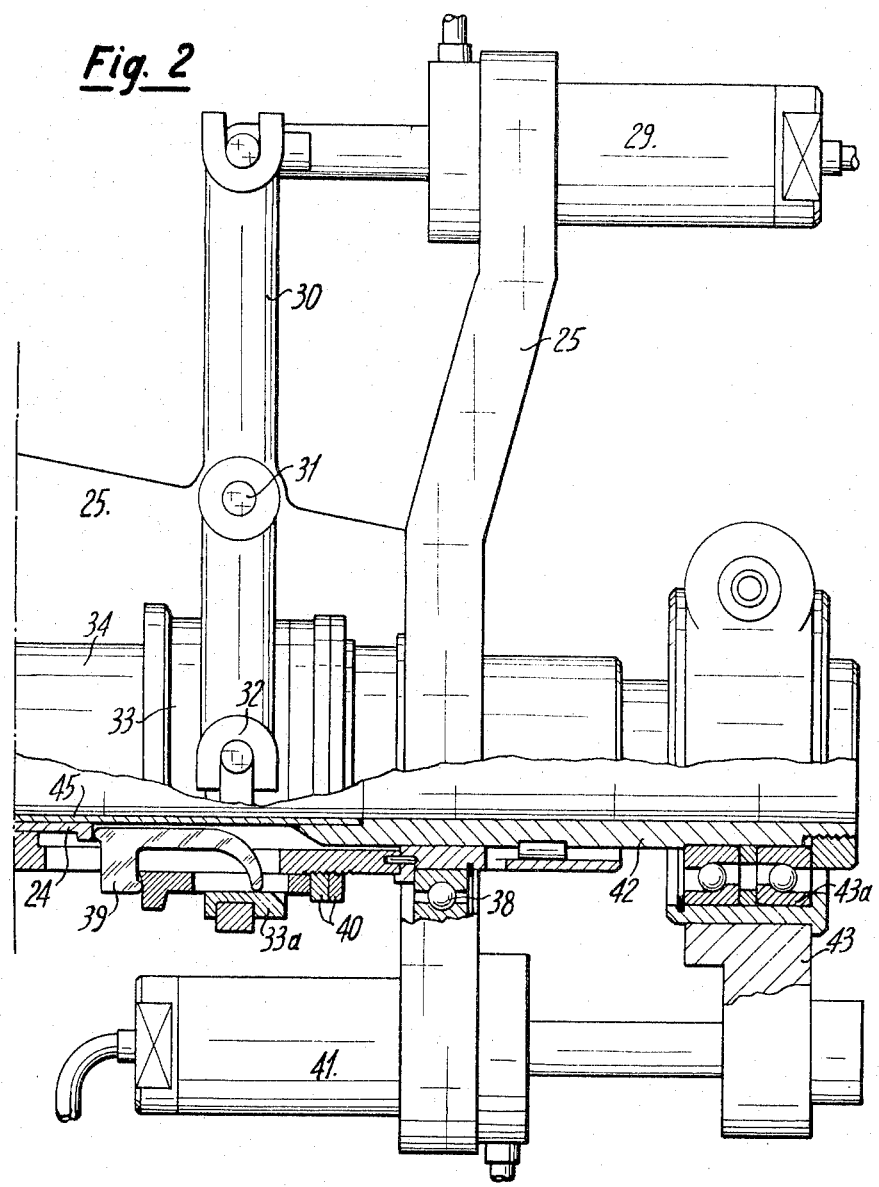

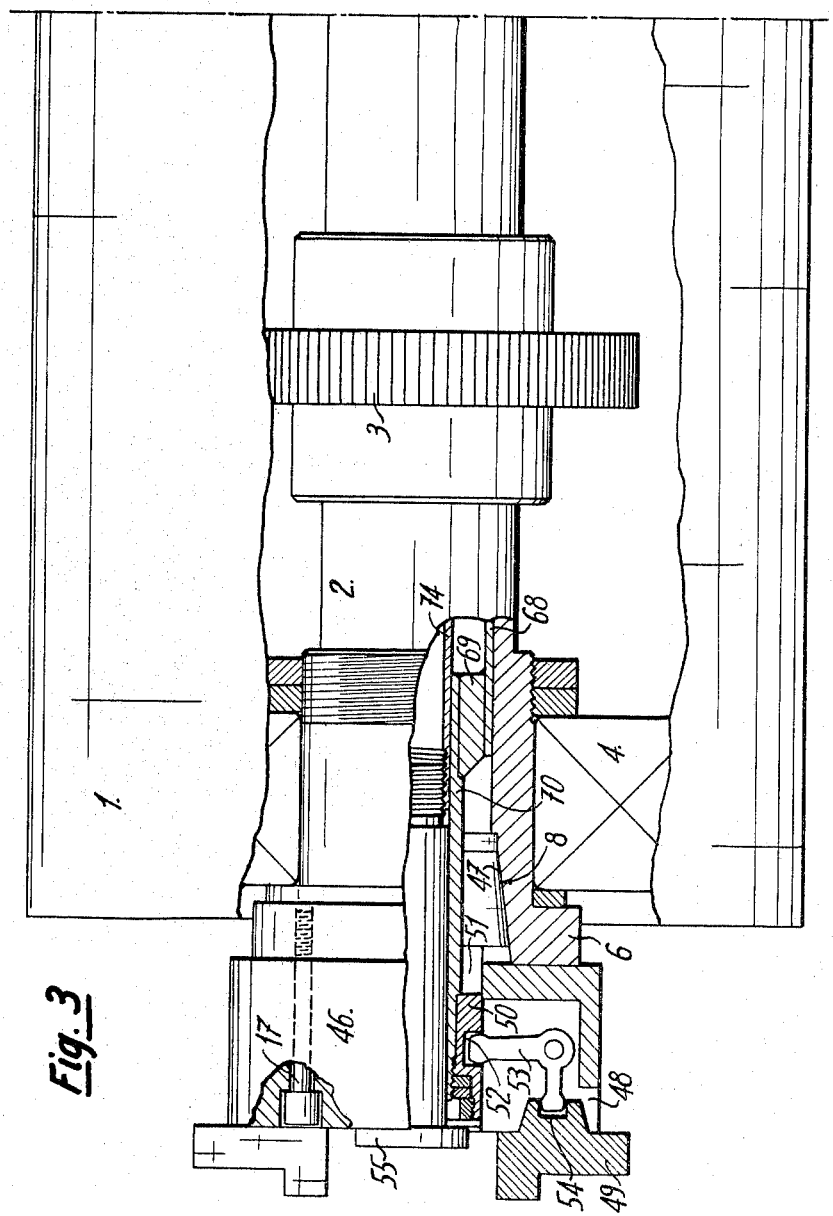

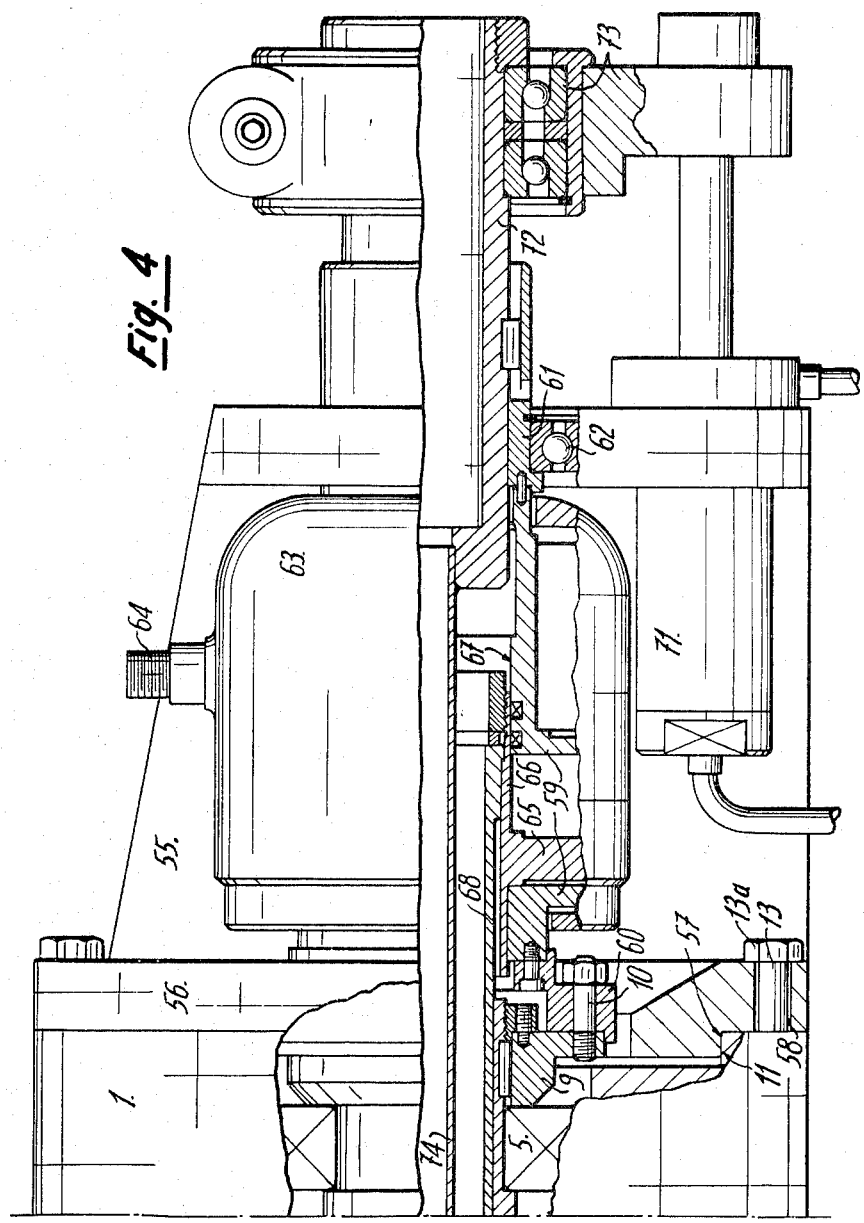

Automatic lathes are generally equipped either for work on bars the clamping of which is effected by collets or for work on blank, die-worked, forged or cast elements the clamping of which is effected by chucks. The control of the clamping devices either by collets or by chucks is effected mechanically, pneumatically, hydraulically or electrically according to the type of lathe under consideration.

The clamping method employed (by collet or by chuck) determines the design of the spindle of a lathe so that present lathes are equipped either for work on bars with collet clamping or for work on blank elements with chuck clamping and cannot easily be transformed. Indeed, in order to transform a lathe equipped for collet clamping into a lathe equipped for chuck clamping, it is necessary to exchange the whole spindle which entails considerable and high precision work in order to adjust the new spindle on the lathe. Such a spindle exchange can generally only be effected in the manufacturers' workshops which entails for the user of the lathe high costs and often a very long period of immobilisation.

The present invention has for object an automatic lathe tending to remove the above mentioned drawbacks by the fact that it comprises a rotary spindle passing through from one side to the other of a headstock, this spindle comprising at its front end attachment means for a removable clamping device for clamping a workpiece to be machined and at its rear end a coupling member, by the fact that the headstock comprises on its rear face an attachment device and by the fact that the coupling member and the attachment device mechanically connect the spindle and the headstock respectively to an interchangeable control device controlling in particular the said clamping device.

The accompanying drawing shows diagrammatically and by way of example an automatic lathe object of the invention.

FIGS. 1 and 2 show partly the headstock of the automatic lathe the latter being equipped to effect work on bars, certain parts being seen in section.

FIGS. 3 and 4 show partly the headstock of the automatic lathe the latter being equipped to effect work on blank pieces, certain parts being seen in section.

Figure 1:
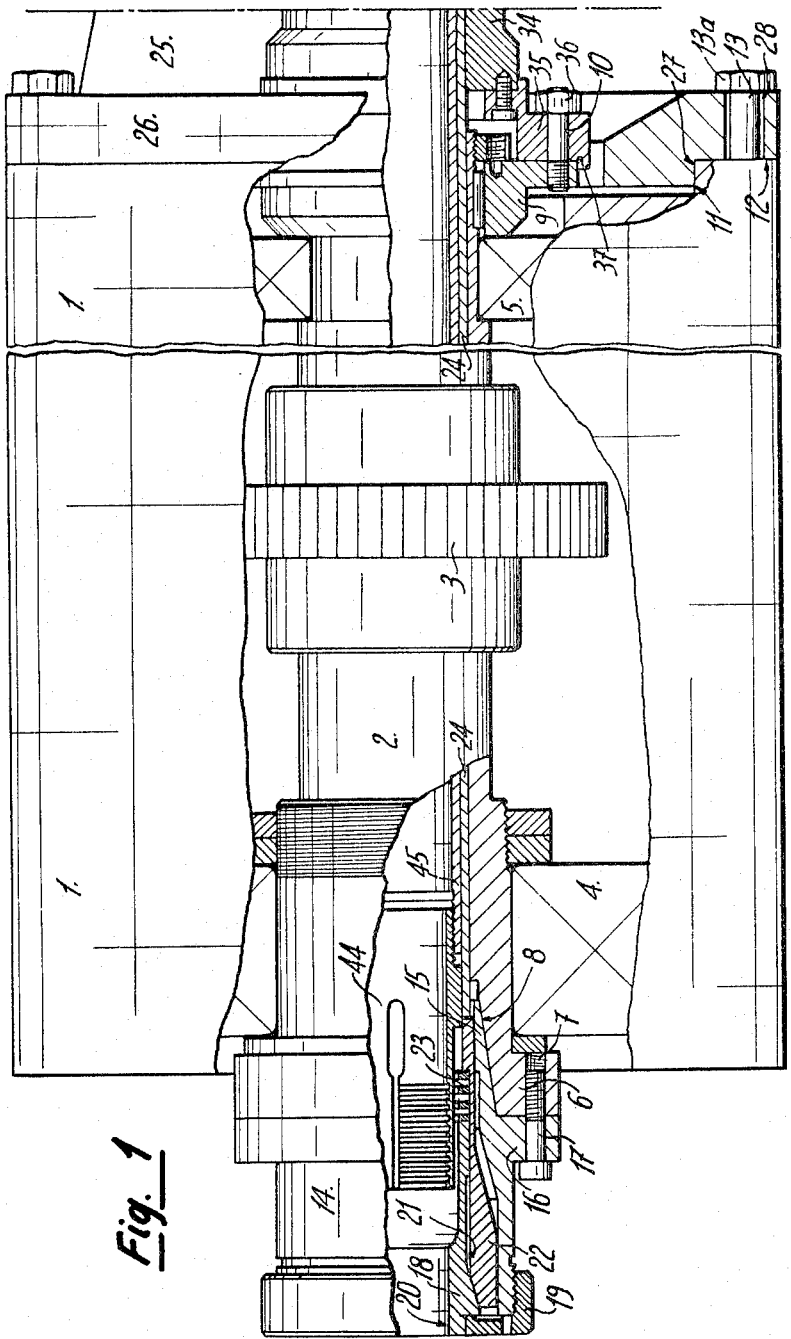

The automatic lathe according to the invention comprises as in the case of existing lathes, a frame carrying among other elements a headstock 1 on which is mounted a rotary tool spindle 2.

This spindle 2 is constituted by a hollow shaft pivoting in the headstock 1 through the agency of ball bearings 4 and 5 for example. This hollow shaft carries in the example shown a toothed wheel 3 for rotating the said spindle by means of a known driving device not shown. This spindle 2 passes through the headstock 1 and merges out of said headstock at each end.

The front end of this spindle 2 is provided with attachment means, constituted in the example shown by a web 6 comprising tappings 7 whose axis is parallel to the axis of the spindle 2 and distributed uniformly over the periphery of the web as well as by a female jaw cone 8.

The rear end of this spindle 2 is provided with a coupling member constituted in the example shown by a disc 9 rigidly fixed, both axially and angularly, relative to the spindle 2. This disc 9 is provided with studs 10 distributed uniformly about its periphery and the free part of which projects out of the rear free face of this disc 9.

This spindle 2 is therefore accessible from the two front faces, fore and rear, of the headstock 1 and may be coupled on the one hand to a clamping device at its fore end and on the other hand to a control device for the said clamping device at its rear end.

The headstock further comprises on its rear face a centering and attachment device formed in the example shown by a shoulder 11 strictly concentric with the axis of the spindle 2 ensuring centering, and a flat face 12 perpendicular to the axis of the spindle 2 and provided with studs 13. Due to this centering and attachment device a control device may be fixed in a well defined position relative to the headstock 1.

When the automatic lathe is equipped to effect bar-work (FIGS. 1 and 2) the clamping device carried by the front end of the spindle 2 is constituted by clamping collets and the control device fixed to rear end of the spindle is constituted by a unit including a bar-clamping device and a feed bar device.

The clamping collets comprise an outer sleeve 14 including at its rear end on the one hand a male centering cone 15 and on the other hand a web 16 pierced with holes equal in number to the tappings 7 of the web 6 of the spindle. These collects are fixed on the front part of the spindle by the engagement of the cone 15 in the cone 8 as well as by bolts 17 forcing the webs 16 and 6 one against the other.

These clamping collets further comprise, as in the case of existing clamping collets, clamping members or jaws 18 disposed inside an actuating sleeve 22 the axial position as well as the maximum opening position of which are determined by an end ring 19 screwed on the front end of the outer sleeve 14. These clamping members have an inner clamping surface 20 adapted to cooperate with the bar to be clamped and an outer surface 21 comprising a conical portion. The actuating sleeve 22 is disposed between the inner surface of the sleeve 14 and the outer surface 21 of the clamping members and comprises on an inner surface a conical portion cooperating with the conical portion of the clamping members 18. This actuating sleeve 22 is movable axially against the action of a return spring 23 by means of the bar-clamping device through the agency of a control tube 24.

The operation of these clamping collets is conventional, an axial forward movement of the actuating sleeve 22 produces a radial inward movement of the clamping members and therefore the clamping of a bar engaged between these clamping members 18.

The control device comprises an auxiliary frame 25 including a web 26 provided with a centering face 27 adapted to cooperate with the centering shoulder 11 carried by the headstock 1 and holes 28 permitting the passage of the attachment studs 13 carried by the headstock 1. This control device is fixed in position on the headstock by means of nuts 13a.

This auxiliary frame 25 is therefore secured to the headstock 1 in a well defined position, centered on the axis of the spindle 2, and carries on the one hand a bar-clamping device controlling the clamping collets and on the other hand a feed-bar device causing the bar to advance.

The bar-clamping device is of conventional type and comprises a hydraulic or pneumatic cylinder 29 fixed on the auxiliary frame the piston of which actuates a control lever 30 pivoting at 31 on the auxiliary frame and the free end 32 of which drives a ring 33a in its linear movements along a sleeve 33 fixed on a hollow shaft 34 coaxial with the spindle 2. This hollow shaft 34 prolongs the spindle and is coupled thereto by means of a ring 35 applied, by means of clamping members 36 engaged on the studs 10, against the disc 9 carried by the spindle. This ring 35 has a centering shoulder 37 ensuring that the hollow shaft 34 is fixed on the spindle exactly in alignment therewith. This hollow shaft pivots adjacent to its free rear end on the auxiliary frame 25 by means of a ball bearing 38.

The control tube 24 disposed inside the spindle 2 and extending inside the hollow shaft 34 bears, under the action of the spring 23 and through the agency of dogs 39, on the forward front face of the sleeve 33. The position of this sleeve 33 is determined by means of an abutment 40. This bar-clamping device being known per se it will not be here described in further detail.

The feed-bar device is also of a conventional type and comprises a pneumatic or hydraulic double-acting jack 41 rigidly secured to the auxiliary frame 25 the piston of which is mechanically connected to a tube 42, sliding inside the hollow shaft 34 and keyed thereon. In this way this tube is capable of rotating about itself, driven by the rotation of the spindle and of the hollow shaft 34, and of moving axially through displacements controlled by the piston of the double-acting jack 41 the end of which is fixed to a support 43 carrying a ball collar 43a.

This tube 42 is connected mechanically to the collets of the feed-bar clamp 44, located partly inside the spindle and partly inside the clamping members 18, by an intermediate tube 45 located inside the spindle 2 and extending inside the hollow shaft 34. This feed-bar device being well known and extensively employed, it will not be here described in further detail.

The automatic lathe according to the invention is, when equipped as described above, absolutely identical to an automatic lathe for work on bars and its well known operation need not be further described.

When the user desires no longer to carry out work on bars but instead completing work on raw or blank workpieces he replaces the clamping device and its control device by corresponding devices but adapted for work on blank workpieces.

The user first proceeds with the dismantling of the clamping collets as well as of its control device. This is carried out very rapidly and very easily by the following operations:

(1) The bolts 17 are unscrewed and the clamping collets withdrawn out of the female cone 8 of the attachment means carried by the forward end of the spindle 2.

(2) The nuts 36 fixing the ring 35 of the control device to the coupling member carried by the rear end of the spindle are unscrewed.

(3) The nuts 13a are unscrewed and the control device is withdrawn, which causes the withdrawal of the tubular elements 24, 34, 44 and 45 out of the spindle 2.

As from that moment, the automatic lathe according to the present invention is ready to be equipped to effect work on blank pieces. Indeed, as from this moment the user secures in the place of the clamping collets and of its control device a new clamping device constituted by a chuck and its control device.

The chuck of conventional type comprises a body 46 of general cylindrical shape comprising on its rear face a male centering cone 47 engaged in the female cone 8 of the attachment means carried by the spindle. This chuck is fixed in the operating position as in the case of the clamping collets by bolts 17 engaged in the tappings 7 of the web 6 of the said attachment means carried by the spindle. The front face of this spindle 2 bears against the rear face of the cylindrical part of the body 46 of the chuck. The front face of the body 46 comprises radial slides 48 in which slide jaws 49.

This chuck further comprises an actuating device for the jaws 49 comprising a ring 50 sliding in a bore 51 coaxial with the body 46 and comprising a groove 52 made in its outer surface. Small L-shaped links 53 pivot on their elbows on the body 46 of the chuck and mechanically connect the ring 50 to each of the jaws 49. Indeed, one of the ends of these small links is engaged in the groove 52 of this ring 50 while the other end of these small links is engaged in one of the housings 54 made in the jaws 49.

The chuck further comprises an ejector 55 constituted in the example shown by a sliding rod coaxial with the body 46 of the chuck.

The movements of the ring 50 controlling the jaws 49 as well as the ejector 55 are controlled by the control device of the chuck in known manner and described briefly hereafter.

The control device for the chuck is constituted by a clamping device and an ejection device.

This control device comprises an auxiliary frame 55 having a web 56 provided with a centering face 57 adapted to cooperate with the centering shoulder 11 carried by the headstock 1 and holes 58 giving passage, when the auxiliary frame is in the operating position, to the attachment studs 13 carried by the headstock. In operating position this auxiliary frame is fixed to the headstock by means of nuts 13a. This auxiliary frame is therefore fixed to the headstock 1 in a well defined position, centered on the axis of the spindle 2. This control device is therefore fixed to the headstock in a manner similar to that of the control device of the clamping collets.

The clamping device is of conventional type and comprises a rotating cylinder 59 whose forward front face is rigidly fixed to the disc 9 carried by the rear part of the spindle 2 through the agency of a ring 60 in a manner similar to the attachment of the hollow shaft 34 to the disc 9 when the lathe is equipped for bar-clamping.

This rotating cylinder is integral with a sleeve 61 pivoting on the auxiliary frame 55 by means of a ball bearing 62. A case 63 is rigidly fixed to the auxiliary frame 55 and comprises an inlet 64 for fluid under pressure communicating with the rotating cylinder 59 from the rear side of a piston 65 having the shape of a disc integral with a tube 66 sliding and rotating in a bore 67 made in the rotating cylinder 59. The rear part of the tube 66 of this piston 65 is coupled in known manner to a tubular element 68 extending partly across the tube 66 and the spindle 2 and the forward front end of which is integral with the outer surface of a ring 69 the inner surface of which is integral with a control tube 70 the front end of which is coupled in known manner to the ring 50 of the actuating device for the jaws 49 of the chuck.

The connections of the tube 66 of the piston 65 to the tubular element 68 as well as of the control tube 70 to the ring 50 of the actuating device for the jaws 49 both permit an axial adjustment giving full freedom for the user to adjust the clamping diameter of the jaws 49 and the pressure exerted by the latter on the workpiece to be machined.

The ejection device is also of conventional type and comprises a double-acting jack 71 rigidly secured to the auxiliary frame 55 the piston of which is mechanically connected to a tube 72, sliding axially inside the sleeve 61 but angularly integral with it. This tube 72 is thus capable of moving angularly, driven to rotate by the spindle, and axially through movements controlled by the double-acting jack 71 the end of whose piston is rigidly fixed to the support 73 carrying the ball collar 73a.

This tube 72 is integral with a control rod 74 extending inside the rotating cylinder 59 and the spindle 2 and the front end of which is coupled, for example, by means of a screw coupling, to the rear end of the ejector 55 which slides axially inside the control tube 70.

The automatic lathe according to the invention is, when thus equipped, absolutely identical to an automatic lathe for chuck work and its well known operation need not be described in further detail.

It is obvious that in modifications not shown of the lathe, the clamping devices, by collets or by chuck, and the control, bar-clamping and feeding-bar devices or the clamping control and the ejection device, could be modified or replaced by similar known devices.

The principal characteristic of this invention being of course the interchangeableness of the clamping and control devices which permits of making an automatic lathe truly universal. This interchangeableness of these devices in rendered possible by the fact that the spindle 2 passes through the headstock 1 from one end to the other, that said spindle is provided at its front end with attachment means and at its rear end with a coupling member and that the headstock 1 comprises on its rear face an attachment and centering device. It is obvious that the attachment means and the coupling member for the spindle as well as the attachment and centering device for the headstock could be realized in different ways as the one shown and described above so long as their functions be respected.

The necessary operations for modifying the automatic lathe to change from operation for bar-work to operation for work on a blank workpiece are extremely simple and may be effected by each user in his own workshop. Up to now this was quite impossible, the spindle itself having to be dismantled and replaced in order to carry out this work.

I claim:

1. An automatic lathe which comprises a rotary spindle passing through a headstock from one end to the other, this spindle comprising at its front end attachment means for a removable clamping device for clamping a workpiece to be machined and at its rear end a coupling member constituted by a disc rigidly fixed at the end of said spindle and having a plurality of studs extending parallel to said spindle and outwardly relatively to said headstock removably to secure a control device to said spindle, said headstock comprising on its rear face an attachment device and in which further the coupling member and the attachment device mechanically connect the spindle and the headstock respectively to said control device controlling in particular the said clamping device.

2. An automatic lathe which comprises a rotary spindle passing through a headstock from one end to the other, said spindle comprising at its front end attachment means for a removable clamping device for clamping a workpiece to be machined and at its rear end a coupling member, said clamping device constituted by a chuck, a coupling member at the opposite end of said spindle, said headstock comprising on its rear face an attachment device, said coupling member and attachment device mechanically connecting said spindle and headstock respectively to an interchangeable control device controlling said clamping device and including an ejection device mechanically connected through the interior of said spindle to an ejector sliding axially in said chuck.

3. An automatic lathe which comprises a rotary spindle passing through a headstock from one end to the other, this spindle comprising at its front end attachment means for a removable clamping device for clamping a workpiece to be machined and at its rear end a coupling member constituted by a disc rigidly fixed at the end of said spindle and having connecting means adapted removably to secure a control device to said spindle, said headstock comprising on its rear face an attachment device and in which further the coupling member and the attachment device mechanically connect the spindle and the headstock respectively to said control device controlling in particular the said clamping device.

References Cited by the Examiner

UNITED STATES PATENTS

| 2,401,072 | 5/1946 | Himoff | 82—28 |
| 2,546,326 | 3/1951 | Wetzell | 279—4 |
| 2,906,540 | 9/1959 | Butterworth et al. | 279—4 |

OTHER REFERENCES

Product Engineering: vol. XX, No. 7, pp. 128, 129, July 1949.

WILLIAM W. DYER, JR., *Primary Examiner.*

LEONIDAS VLACHOS, *Examiner.*